(12) United States Patent
Moorthy et al.

(10) Patent No.: US 11,740,969 B2
(45) Date of Patent: *Aug. 29, 2023

(54) DETECTING AND RECOVERING A CORRUPTED NON-VOLATILE RANDOM-ACCESS MEMORY

(71) Applicant: DELL PRODUCTS L.P., Round Rock, TX (US)

(72) Inventors: Gowtham Moorthy, Namakkal District (IN); Annappa Kumar MN, Bangalore (IN); Shekar Babu Suryanarayana, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/900,247

(22) Filed: Aug. 31, 2022

(65) Prior Publication Data

US 2022/0413962 A1    Dec. 29, 2022

Related U.S. Application Data

(63) Continuation of application No. 17/236,549, filed on Apr. 21, 2021, now Pat. No. 11,507,455.

(51) Int. Cl.
| | | |
|---|---|---|
| *G06F 11/10* | (2006.01) | |
| *G06F 11/14* | (2006.01) | |
| *G06F 11/07* | (2006.01) | |

(52) U.S. Cl.
CPC ...... *G06F 11/1068* (2013.01); *G06F 11/0772* (2013.01); *G06F 11/1438* (2013.01); *G06F 11/1471* (2013.01); *G06F 2201/84* (2013.01)

(58) Field of Classification Search
CPC ............. G06F 11/1068; G06F 11/0772; G06F 11/1438; G06F 11/1471; G06F 2201/84
USPC ............... 714/764, 763, 769, 773, 799, 718; 365/200, 201
See application file for complete search history.

(56) References Cited

U.S. PATENT DOCUMENTS

| | | | |
|---|---|---|---|
| 6,560,703 B1 * | 5/2003 | Goodman | G06F 9/4403 713/2 |
| 8,942,543 B1 * | 1/2015 | Hubin | H04N 9/8205 386/277 |
| 10,579,300 B2 | 3/2020 | Pepper et al. | |
| 10,635,599 B2 * | 4/2020 | Duzly | G06F 11/1048 |
| 11,507,455 B2 * | 11/2022 | Moorthy | G06F 11/1471 |

(Continued)

OTHER PUBLICATIONS

Yamakita et al., Phase-based Reboot: Reusing Operating System Execution Phases for Cheap Reboot-based Recovery, Jun. 1, 2011, IEEE, pp. 169-180. (Year: 2011).*

*Primary Examiner* — John J Tabone, Jr.
(74) *Attorney, Agent, or Firm* — Larson Newman, LLP (57) ABSTRACT

An information handling system includes a memory manager that may detect corruption of a non-volatile random-access memory, and perform a recovery process of the non-volatile random-access memory that includes determining whether a header of the non-volatile random-access memory is corrupted. If the header is not corrupted, then a data region associated with the header may be recovered from recovery data values in a spare store in the non-volatile random-access memory. If the header is corrupted, then the header and the data region may be recovered from default data values.

20 Claims, 10 Drawing Sheets

(56) References Cited

U.S. PATENT DOCUMENTS

| | | | |
|---|---|---|---|
| 2013/0254457 A1* | 9/2013 | Mukker | G06F 11/1064 |
| | | | 711/E12.008 |
| 2018/0107558 A1 | 4/2018 | Rahardjo et al. | |
| 2018/0314830 A1* | 11/2018 | Strünkmann | G06F 21/51 |
| 2019/0163554 A1* | 5/2019 | Agrrawal | G06F 11/079 |
| 2019/0377644 A1 | 12/2019 | Kulkarni et al. | |
| 2020/0034307 A1* | 1/2020 | Duzly | G06F 12/0246 |
| 2020/0394303 A1* | 12/2020 | Suryanarayana | G06F 21/572 |
| 2022/0342751 A1* | 10/2022 | Moorthy | G06F 11/1438 |

* cited by examiner

DETECTING AND RECOVERING A CORRUPTED NON-VOLATILE RANDOM-ACCESS MEMORY

CROSS-REFERENCE TO RELATED APPLICATION

This application is a Continuation of U.S. patent application Ser. No. 17/236,549 entitled "DETECTING AND RECOVERING A CORRUPTED NON-VOLATILE RANDOM-ACCESS MEMORY" filed Apr. 21, 2021, the disclosure of which is hereby expressly incorporated by reference in its entirety.

FIELD OF THE DISCLOSURE

The present disclosure generally relates to information handling systems, and more particularly relates to detecting and recovering a corrupted non-volatile random-access memory.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a memory manager that may detect corruption of a non-volatile random-access memory, and perform a recovery process of the non-volatile random-access memory that includes determining whether a header of the non-volatile random-access memory is corrupted. If the header is not corrupted, then a data region associated with the header may be recovered from recovery data values in a spare store in the non-volatile random-access memory. If the header is corrupted, then the header and the data region may be recovered from default data values.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 4A-FIG. 4K are block diagrams illustrating an example of stages for detecting and recovering a corrupted NVRAM, according to an embodiment of the present disclosure.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
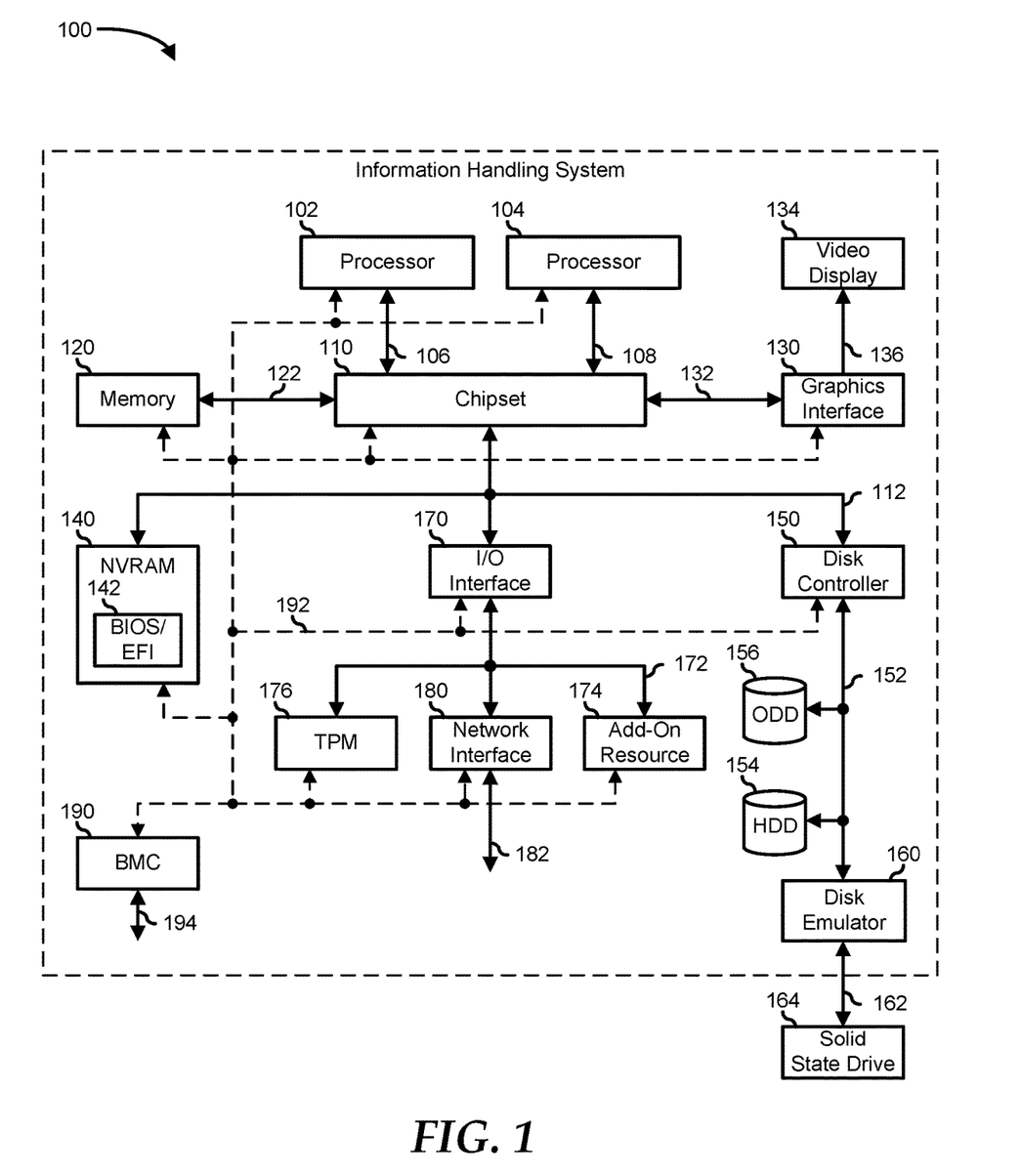
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, an NVRAM 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random-Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NVRAM 140, disk controller 150, and I/O interface 170 are connected to chipset 110 via an I/O channel 112. An example of I/O channel 112 includes one or more point-to-point PCIe links between chipset 110 and each of NVRAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NVRAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out-of-band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to the NVRAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a random-access memory (RAM) or NVRAM associated with the BMC. Information stored in the RAM may be lost after power-down of the power plane for BMC 190, while information stored in the NVRAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

NVRAM is a type of RAM that retains data after the power to the information handling system is turned off. The NVRAM may be used to store the BIOS and is also typically used to hold the initial processor instructions required to bootstrap the system, store calibration constants, passwords, or setup information. The setup information may be stored as variables in the NVRAM so that the variables are available during system boot from a power-off state. From time to time these variables may have to be updated. An NVRAM driver uses NVRAM headers to initialize and enable variable read/write services.

The NVRAM headers include information regarding the NVRAM such as the total variable space and authentication status that is used by the variable service. Typically, a data value of a particular variable may be updated. To perform the update, the current location of the variable to be updated in the NVRAM is marked as "invalid" or "deleted". The new variable data is written in a new location in the NVRAM and marked as "valid" or "added." At some point, the available space for the variables may run out which requires a reclaim of the variable space occupied by the invalid or deleted variables.

The reclaim operation may encounter a failure in certain cases such as when there is a system power failure, accidental system shutdown or restart, reclaim operation abort due to hardware or software failure, etc. When this happens, there is a possibility of corruption in the active NVRAM memory block and the NVRAM spare memory where the reclaim status is maintained. If the spare memory block is corrupted, then the variable data values and headers may not be recovered. If the NVRAM is not recovered then the information handling system may fail to boot as some of the boot and runtime variable data values are stored in the NVRAM. Also, one or more features of the BIOS may not work properly as some of its features may be disabled. Flashing the BIOS and/or recovering the platform typically are time-intensive and require two system boot cycles. If the information handling system fails to boot successfully, the user may have to contact customer support which may affect product perception. To address the aforementioned and other concerns, the present disclosure provides systems and methods to detect and recover a corrupted NVRAM.

Figure 2:
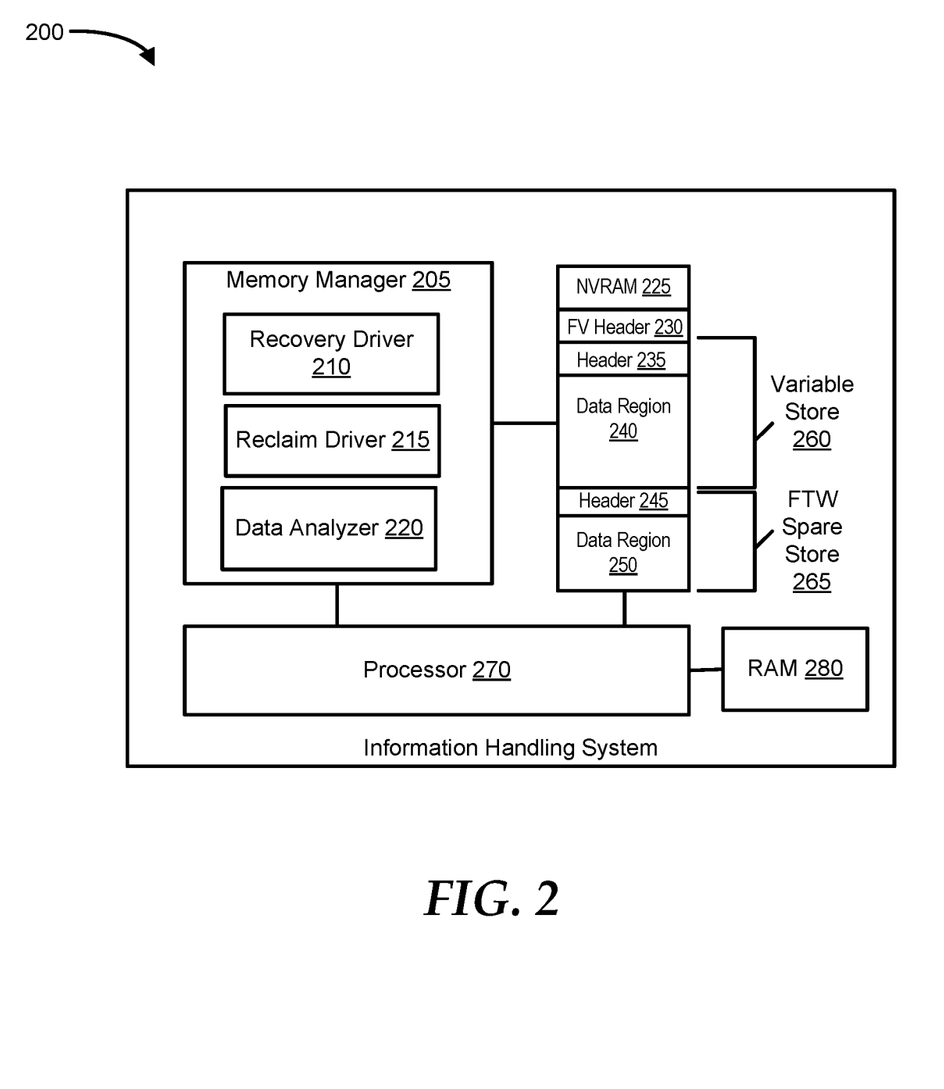
FIG. 2 is a block diagram illustrating an example of an information handling system configured for detecting and recovering a corrupted non-volatile random-access memory (NVRAM), according to an embodiment of the present disclosure.

FIG. 2 shows an information handling system 200 configured for detecting and recovering a corrupted NVRAM. Information handling system 200 is similar to information handling system 100, and includes a memory manager 205, an NVRAM 225, a processor 270, and a RAM 280. Memory manager 205 includes a recovery driver 210, a reclaim driver 215, and a data analyzer 220. NVRAM 225 includes a firmware volume (FV) header 230, a variable store 260, and a fault-tolerant working (FTW) spare store 265. Variable store 260 includes a header 235 and a data region 240. FTW spare store 265 includes a header 245 and a data region 250. NVRAM 225 may also include an FTW spare store not shown. The components of system 300 may be implemented in hardware, software, firmware, or any combination thereof. The components shown are not drawn to scale and information handling system 200 may include additional or fewer components. In addition, connections between components may be omitted for descriptive clarity.

Processor 270 is similar to processor 102 or processor 104 of FIG. 1 and may be configured to perform any one or more of the methods or operations of information handling system 200. Reclaim driver 215 may be configured to reclaim one or more memory blocks of NVRAM 255 by removing all entries marked as deleted or invalid. The reclaim driver may copy the data to the beginning of variable store 415 and then erase all variables marked deleted or invalid.

NVRAM 225 is similar to NVRAM 140 of FIG. 1, and may be configured to store data that needs to persist between boots. For example, NVRAM 225 may be configured to store system configuration data such as UEFI variables or simply referred to as variables, advanced configuration and power interface (ACPI) information, and/or other BIOS firmware data values. Many of these system configuration data are architecturally defined and setting invalid options could cause information handling system 200 failure to boot. NVRAM 225 may be implemented by one or more NVRAM storage devices, such as flash memory devices.

FV header 230 may describe the features and layout of the contents of NVRAM 225. In one embodiment, FV header 410 may include a globally unique identifier (GUID) that identifies the FV, size of the FV, its length, location of data which includes a start offset, etc. Header 235 may describe the features and layout of the contents of data region 240 which may be configured to store variables so that the variables are available during system boot from a power-off state. The variables are key/value pairs that include identifying information plus attributes (the key) and arbitrary data (the value). The variables are intended for use as a means to store data that is passed between the UEFI environment implemented in the platform and the UEFI operating system loaders and other applications that run in the UEFI environment.

Data analyzer 220 may be configured to determine a pattern in one or more headers of NVRAM 225 such as FV header 230 and header 235. The headers may be analyzed to determine if there are patterns contained in its data blocks. The data may be deduplicated and/or deltas maintained to allow data analyzer 220 to generate a header based on the pattern and/or deltas during recovery. In addition, data analyzer 220 may be configured to determine a pattern in system configuration data such as the variables stored in data region 240. For example, a snapshot of a particular header and/or variable may be taken and the pattern may be stored in a RAM 280, a data region in NVRAM 225, another NVRAM, or a cache memory.

The present system and method provide a mechanism to recover the NVRAM main memory block, such as variable store 260, from the data values stored in the NVRAM spare memory block, such as FTW spare store 265. The content of FTW spare store 425 may be used during a garbage collection, reclamation, and/or recovery process. The recovery may be performed even if a header such as FV header 230, header 235 is corrupted which includes the reclaim status location and could not be recovered. In this scenario, data region 240 may be reset and the NVRAM variable data values in data region 240 may be replaced with data values from data region 250.

The data values in data region 250 may be default data values or last known good data values. Recovery driver 210 may be configured to check the header 235 and its data values in the initial stage of the boot process to know if there is any corruption in the header. A flag may be set to indicate that the contents of NVRAM 225, such as the system configuration data and/or the associated header are corrupted. If recovery driver 215 finds that NVRAM 225 is corrupted, then recovery driver 210 may be triggered to perform a recovery process using a failover recovery protocol.

Recovery driver 210 may be triggered when an error or corruption is detected in the NVRAM and/or its contents which include the system configuration data and other information stored in the NVRAM. If recovery driver 210 is triggered, then recovery driver 210 may be configured to perform various operations via an NVRAM failover recovery protocol which includes resetting header 235, loading system configuration information such as the variables with default values in data region 240, rebooting information handling system 200, etc. The default values may be a factory version with which information handling system 200 has been configured upon manufacture. The last known good values may be user default values which are a previous version of the system configuration data or its uncorrupted version.

The system configuration data in data region 240 may be loaded from data region 250. Header 235 may be reset using data from header 245. In another embodiment, header 235 may be generated by data analyzer 220 from bit patterns. The bit patterns may be derived from a snapshot taken of the contents of the header and/or data region of NVRAM 225. The snapshot may include the bit position of the data values of the system configuration data and/or the associated header, which saves space versus storing a copy of the data values. Subsequent snapshots may include deltas between the previous snapshot and the current snapshot of the data values. Based on the number of writes and/or the size of the deltas, a version of the system configuration data and/or the associated header may be maintained. A specified number of versions may be maintained to allow flexibility during recovery. The bitwise operation may be performed to generate the header and/or the content of the associated data region during recovery.

In one embodiment, memory manager 205 be configured to detect errors or corruption in the data value read and to correct the detected error or corruption. In addition, memory manager 205 may be configured to notify a user, such as via logs and/or a video display that an error occurred. For example, memory manager 205 may notify the user that corruption in NVRAM 225 was detected and corrected, such as the factory default values or the last known good values that have been loaded. In another example, memory manager 205 may ask the user whether to load factory default values or the last known good values of the system configuration data. The loaded data values used to recover NVRAM 225 may be referred to as recovered data values.

Before initializing the information handling system using the recovered data values, the recovered data values may be authenticated, such as via a specified property GUID. In addition, recovery driver 210 may notify storage and/or other components of information handling system 200 to reset corresponding system configuration data to default values. Recovery driver 210 may also initialize other system variables to support the default values. For example, based on the complementary metal-oxide-semiconductor/embedded controller (CMOS/EC) properties may define some of the variables that initiate the execution of the operating on the CPU. If the variables do not have the right data, then the information handling system may not boot properly.

To address this issue, the present disclosure automatically determines, during system boot or runtime, whether the contents of NVRAM 225 are corrupted. If the contents of NVRAM 225; such as the contents of FV header 230, header 235, data region 240, header 245, and data region 250; are corrupted then recovery data values may be used to recover the data values in the header and/or data region. When NVRAM 225 is corrupted, there might be a chance that information handling system 200 doesn't boot. In this case, typically the user may need to update the BIOS manually. The present disclosure may eliminate the need for the user to update the BIOS manually because the BIOS firmware maybe instead recovered automatically. For example, a default BIOS firmware may be loaded to the BIOS and/or NVRAM 225.

Typically, when a header of the NVRAM is corrupted, the content of the data regions may not be recovered as the location of the data values in the data region is maintained in the header. For example, every variable has a property identifier that maps to a particular offset in the NVRAM. If the header, which includes a property identifier for each of the variables is corrupted, then the variable may not be located. Thus, if the header is corrupted, the recovery mechanism would not be able to locate the data values to be recovered. In the present disclosure, even if a header is corrupted, the content of the data region associated with the header may be recovered after automatically recovering and/or generating the header. For example, even if header 235 is corrupted, data region 240 can be recovered after automatically recovering header 235.

Those of ordinary skill in the art will appreciate that the configuration, hardware, and/or software components of information handling system 200 depicted in FIG. 2 may vary. For example, the illustrative components within information handling system 200 are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 3:
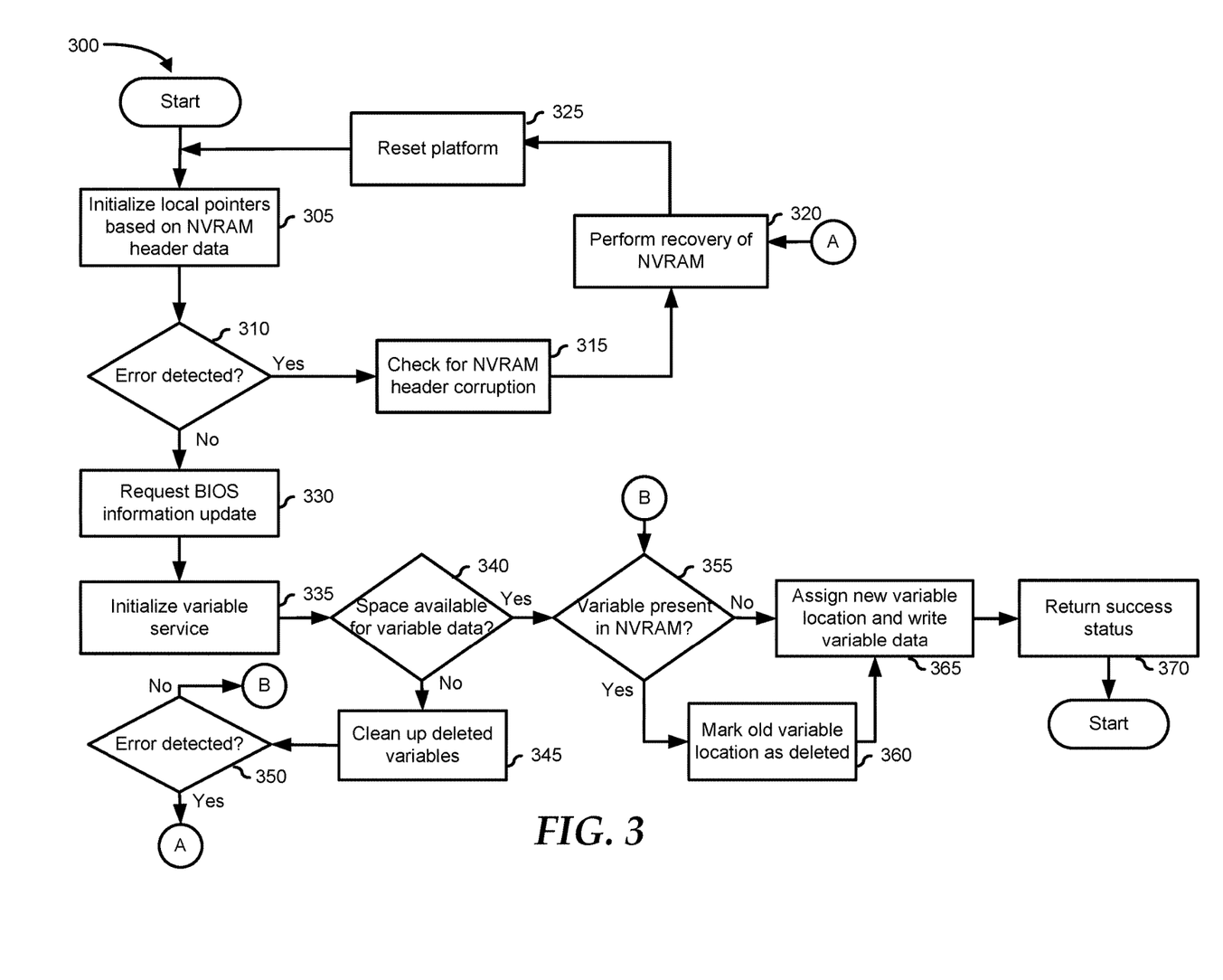
FIG. 3 is a flowchart illustrating an example of a method for detecting and recovering a corrupted NVRAM, according to an embodiment of the present disclosure.

FIG. 3 shows a flowchart of a method 300 for detecting and recovering a corrupted NVRAM. Method 300 may be performed by one or more components of information handling system 200 FIG. 2. While embodiments of the present disclosure are described in terms of information handling system 200 of FIG. 2, it should be recognized that other systems may be utilized to perform the described method. One of skill in the art will appreciate that this flowchart explains a typical example, which can be extended to advanced applications or services in practice.

Method 300 includes dispatching a recovery driver that checks a header of the NVRAM and associated data region during the initial stages of the boot process to determine if there is an error or corruption. In particular, method 300 determines if there is corruption in the NVRAM region (main header). If an error or corruption is detected, then the NVRAM is reset. In addition, the header and/or the data region may be recovered using recovery data values. The recovery data values include default data values or last known good data values. After loading the recovery data values, herein referred to as recovered data values, the information handling system may be rebooted using the recovered data values. Before rebooting the information handling system, the recovered data values may be authenticated using one or more GUIDs.

The recovery driver may also notify other storage components to reset corresponding memory variables to default values prior to the reboot. In addition, the recovery driver may also notify other drivers to reset to default values to support the recovered data values. For example, some of the CMOS/EC properties may be reset. This is to ensure that other memory variables are aligned to the default values of the variables during the reboot.

Method 300 typically starts at block 305 where local pointers are initialized based on information in the header. At decision block 310, the method monitors the NVRAM to determine if there is an error or corruption. The method may monitor the NVRAM at boot and/or runtime process. If an error or corruption is detected, then the "YES" branch is taken and the method proceeds to block 315. If an error or corruption is not detected, then the "NO" branch is taken and the method proceeds to block 330 where the method requests for BIOS information update.

At block 315, the method checks for the corruption of NVRAM header corruption. The method may check for corruption after failing to initialize the variable service. After failing to initialize the variable service and/or checking for NVRAM header corruption, the method proceeds to block 320 where recovery of NVRAM is triggered. The NVRAM recovery may be performed using the NVRAM failover protocol where the method recovers the header and system configuration data from a spare memory store of the NVRAM if the header is valid. Otherwise, if the header is corrupted, the header may be regenerated based on the previous snapshots of the header stored as a bit pattern(s). The header may also be set to default values by resetting the CMOS/EC properties. After recovery of the NVRAM, the method may reset the platform at block 325.

At block 335, the method, in particular, the NVRAM driver may initialize the variable service to read/write variable data values. Before reading and/or writing variable data values to the NVRAM, the method may determine whether there is space available for the variable data values at decision block 340. If there is space available for the variable data, then the "YES" branch is taken and the method proceeds to decision block 355. If there is no space available for the variable data, then the "NO" branch is taken and the method proceeds to block 345 where a reclaim operation of the NVRAM may be performed to clean up the deleted variables. The method proceeds to decision block 350 where the method determines whether an error is detected. If an error is detected, then the "YES" branch is taken and the method proceeds to block 320. If an error is not detected, then the "NO" branch is taken and the method proceeds to decision block 355.

At decision block 355, the method determines whether there is a variable present in the NVRAM. If there is a variable present in the NVRAM, the "YES" branch is taken and the method proceeds to block 360 where the old variable location is marked as deleted and proceeds to block 365. If there is no variable present in the NVRAM, then the "NO" branch is taken and the method proceeds to block 365. At block 365, the method may assign a new variable location and write the variable data in the new location. The method proceeds to block 370 where it returns a success status and the method ends.

FIG. 4 shows a flow diagram depicting stages 400 in the recovery of an NVRAM. The recovery can be performed by one or more components of a memory manager such as memory manager 205 of FIG. 2. FIG. 4A shows a sample layout of an NVRAM 405. NVRAM 405 includes an FV header 410, a variable store 415, an FTW working store 420, and an FTW spare store 425. Variable store 415 includes a header 430 and a data region 435. FTW working store 420 includes a header 440 and FTW record 445a—FTW record 445n. The components shown are not drawn to scale and NVRAM 405 may include additional or fewer components. In addition, connections between components may be omitted for descriptive clarity.

Figure 4A:
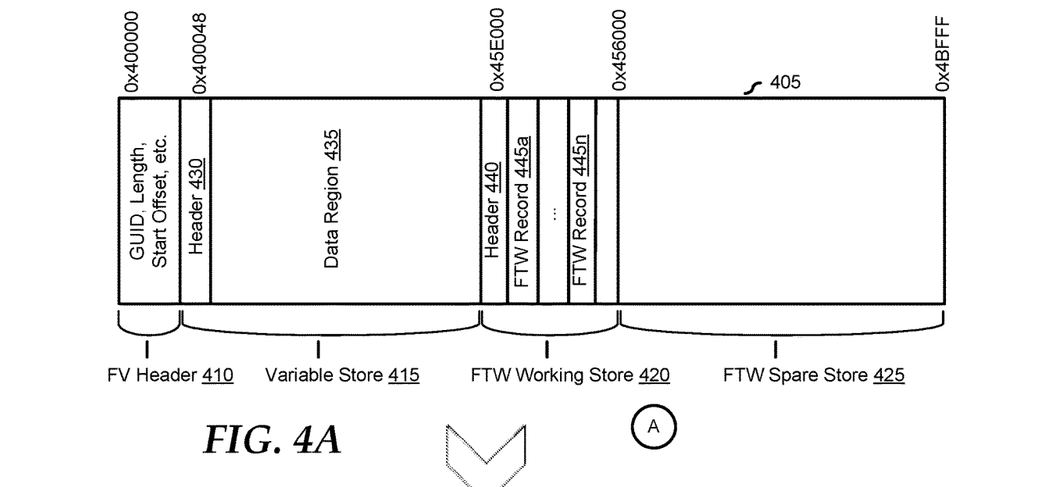

Each one of FIG. 4A-FIG. 4K is associated with a letter of a series of letters A-K. Each of these letters represents a stage of one or more operations. Each figure is associated with a stage. For example, FIG. 4A is associated with stage A, FIG. 4B is associated with stage B, FIG. 4C is associated with stage C, etc. Although these stages are ordered for this example, the stages illustrate one example to aid in understanding this disclosure and should not be used to limit the claims. Subject matter falling within the scope of the claims can vary with respect to the order of the operations.

Variable store 415 is similar to variable store 260 of FIG. 2, wherein its content includes system configuration data. Header 430 describes the features and layout of data region 435. While FTW spare store 425 is similar to FTW spare store 265 of FIG. 2, wherein its content includes recovery data values for the recovery of data region 435 and/or header 430. FTW working store 420 may be used to store data such as variables that are currently being processed. FTW working store 420 includes header 440 that describes the features and layout of FTW record 445a-FTW record 44n that stores the data.

Figure 4B:
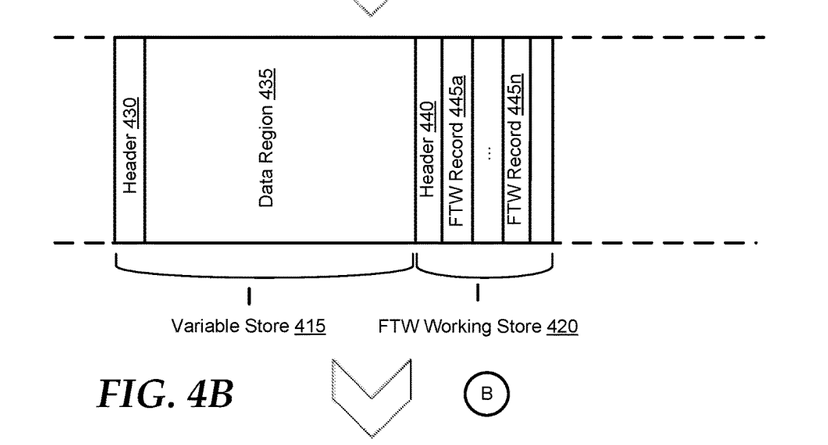
Figure 4C:
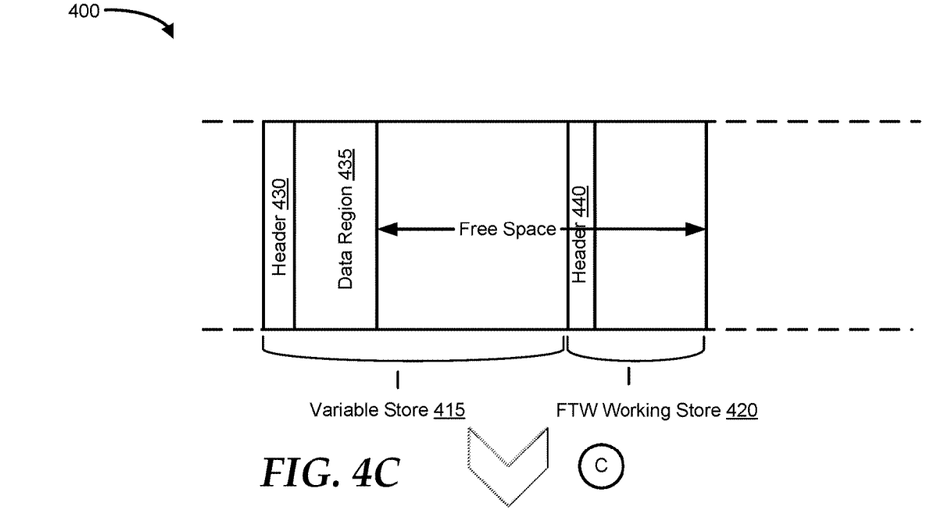

At stage A, variable store 415 and/or FTW working store 420 of NVRAM 405 may get filled up with data. At stage B, when variable store 415 and/or FTW working store 420 is full, then a reclaim process may be started. At this point, the reclaim driver may take a backup of the variable store 415 and/or FTW working store 420 and load it in a memory cache buffer. At stage C, the reclaim driver may clean up the data region of the variable store 415. After the reclaim process is completed, the system configuration data can be written to the reclaimed memory space.

Figure 4D:
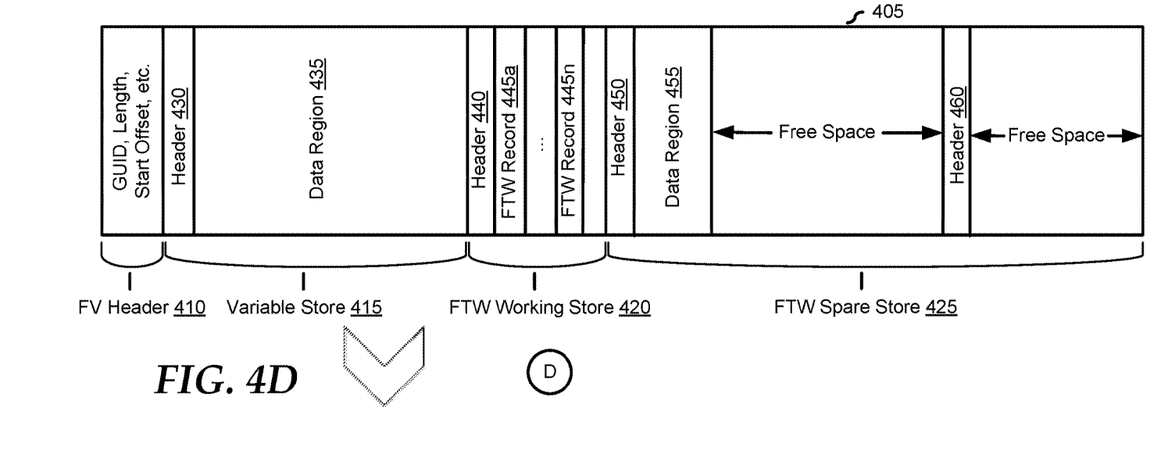
Figure 4E:
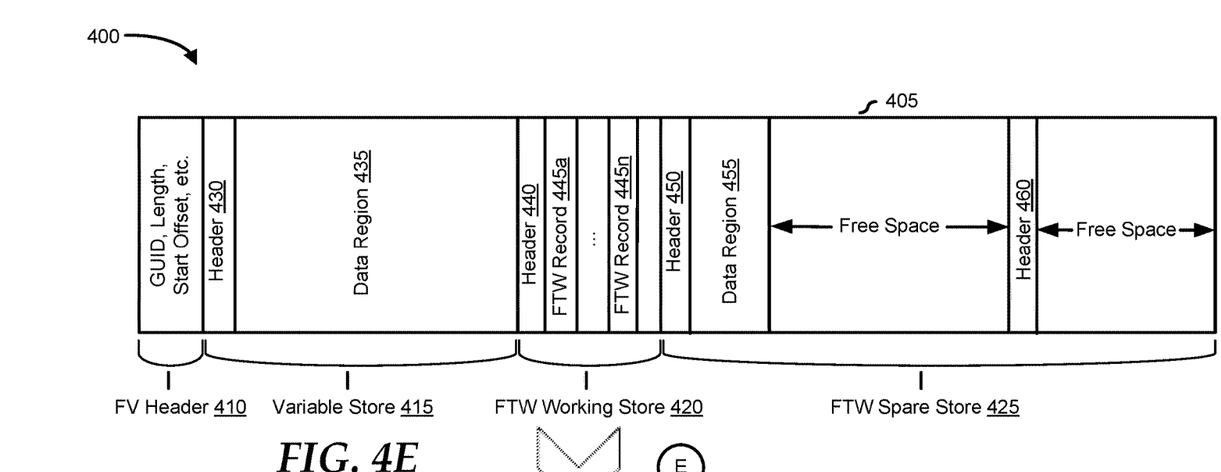

At stage D, FTW working store 420 may be freed up by dumping its data into FTW spare store 425. The data at FTW spare store 425 may also be referred to as recovery data values. The recovery data values may be the default data values or the last known good data values of the system configuration data. At stage E, the data in variable store 415 may be erased by the reclaim driver because of the error or corruption of the contents of the variable store 415 which includes contents of header 430 and data region 435. The contents of variable store 415 may be corrupted during a power failure, a write or an erase operation, etc. At this point, the reclaim driver may attempt a reclaim and perform a reboot. In addition, a reclaim pending flag may also be set to true to indicate a pending reclaim operation. Conversely, if the reclaim pending flag is set to false, then there is no pending reclaim operation.

Figure 4F:
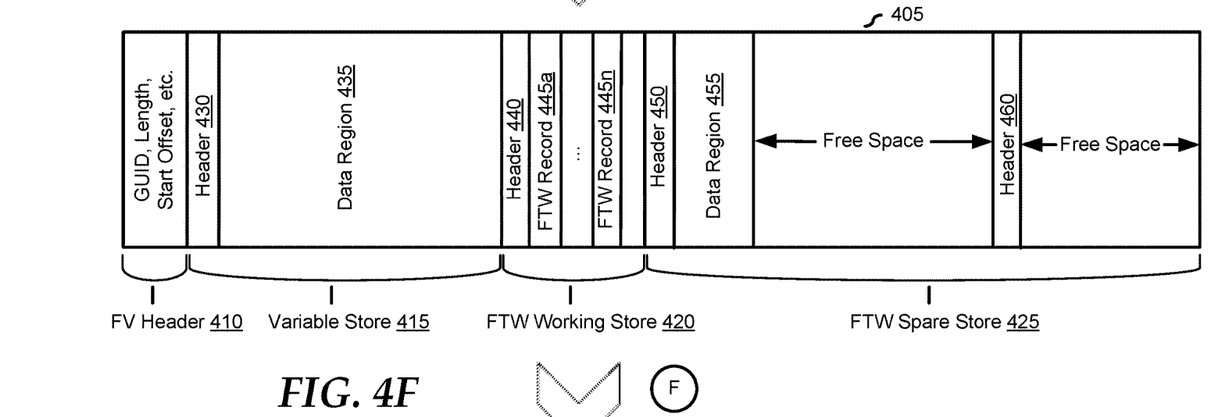
Figure 4G:
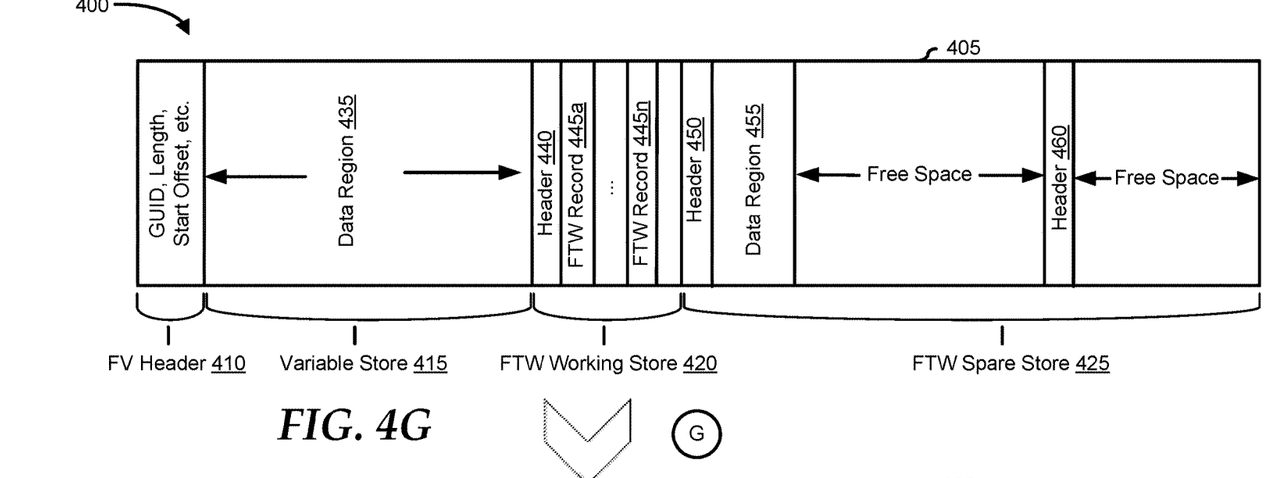
Figure 4H:
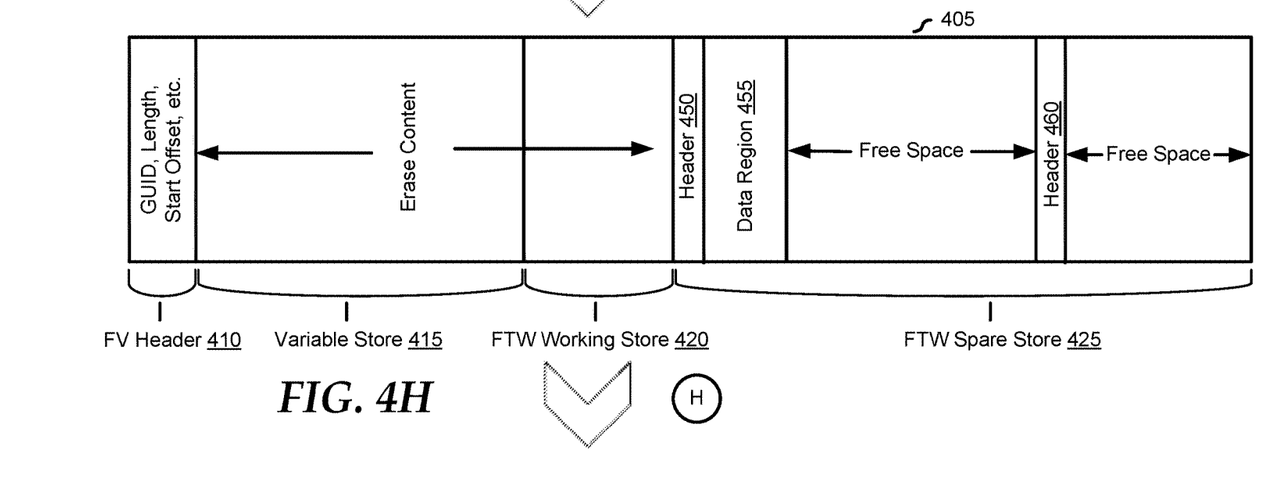

At stage F, the reclaim driver may detect that the FTW working store is full and then check the status of the reclaim pending flag. If the reclaim pending flag is set to true, then the reclaim driver may use the content in FTW spare store 425 to restore the content of variable store 415 and/or FTW working store 420. At stage G, the recovery driver may be configured to determine whether NVRAM 405 is corrupted. For example, the recovery driver may determine whether header 430 and/or data region 435 is corrupted. The recovery driver may determine whether header 430 is corrupted by authenticating its signature. If NVRAM 405 and header 430 are corrupted, then the recovery driver may determine if there is a valid header and/or content of variable store 415 in FTW spare store 425 which may be used to recover header 430 and/or NVRAM 405. In another embodiment, the recovery driver may regenerate header 430 to the original or last known good version from the bit patterns of snapshots taken of header 430. The regenerated header 430 may include recent changes to header 430.

Figure 4I:
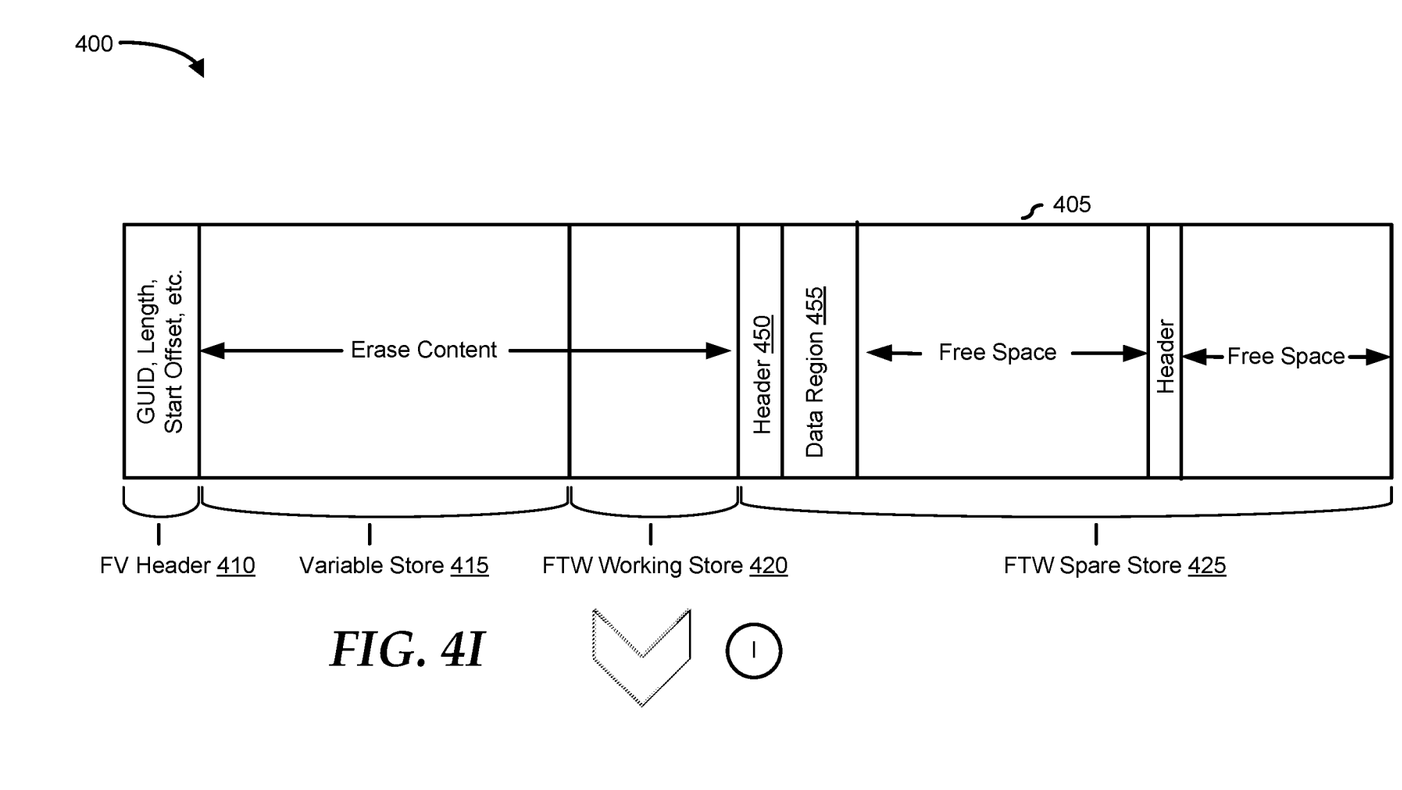
Figure 4J:
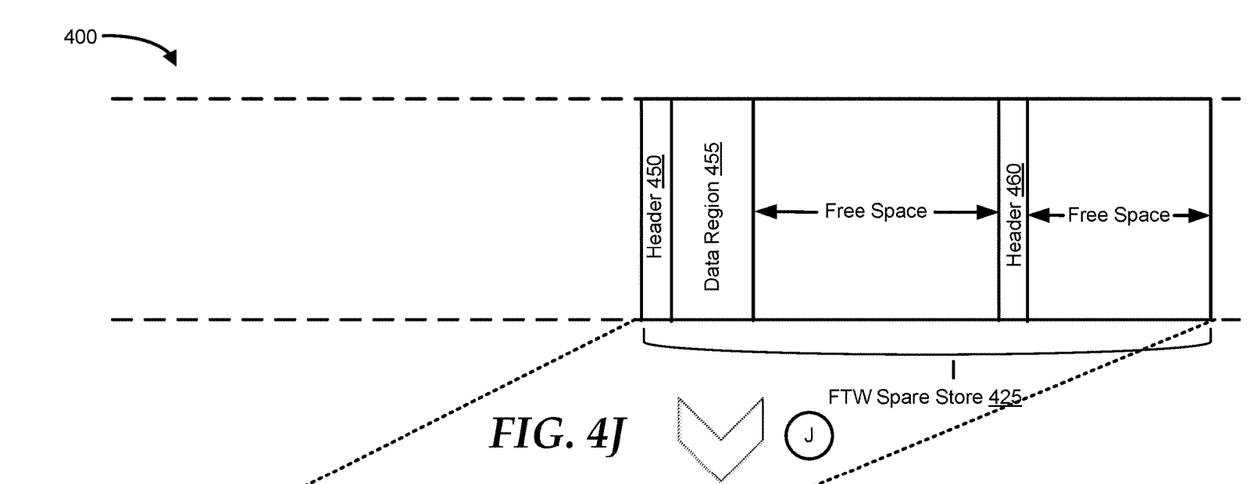

At stage H, recovering the NVRAM may start by erasing the contents of variable store 415 and FTW working store 420. At stage I, the recovery driver may read the content of FTW spare 425 and put it into a memory or cache buffer as shown in FIG. 4J. At stage J, the recovery driver may restore or recover the contents of variable store 415 and FTW working store 420 from the contents of the memory or the cache buffer. For example, header 450 may be used to recover header 430 and data region 455 to recover data region 435. Header 460 may be used to recover header 440. In another embodiment, the recovery driver may restore or recover the contents of variable store 415 and/or FTW working store 420 from the regenerated variable header 430. The contents of FTW spare store 425 may be erased. The reclaim pending flag may be reset to false. Afterwards, the information handling system may be rebooted.

Figure 4K:
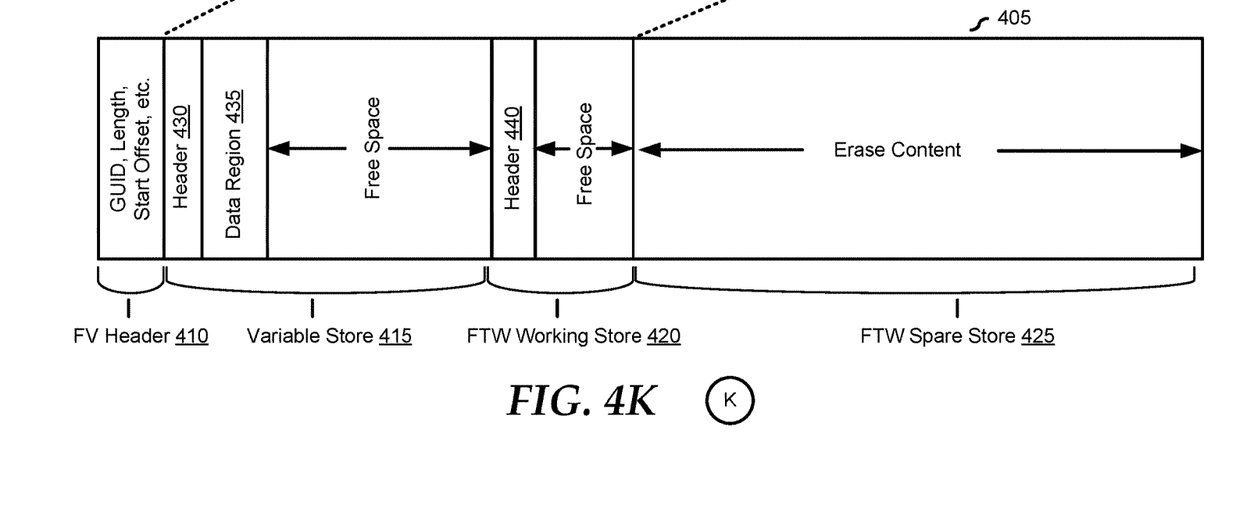

After the reboot, the recovery driver may determine whether the content of variable store 415 and FTW working store 420 is valid. The recovery driver and/or reclaim driver may also determine if there are no pending flags, such as the reclaim pending flag and/or recovery pending flag. For example, the reclaim driver may determine whether the reclaim flag is set to true or false. Also, the recovery driver may determine whether the recovery driver is set to true or false. If there are no particular pending flags, such as reclaim pending flag, then the information handling system may be rebooted using the recovered system configuration data as shown in FIG. 4K at stage K. The recovery pending flag may be set to false. Here, header 430 and data region 435 have been recovered.

Figure 5:
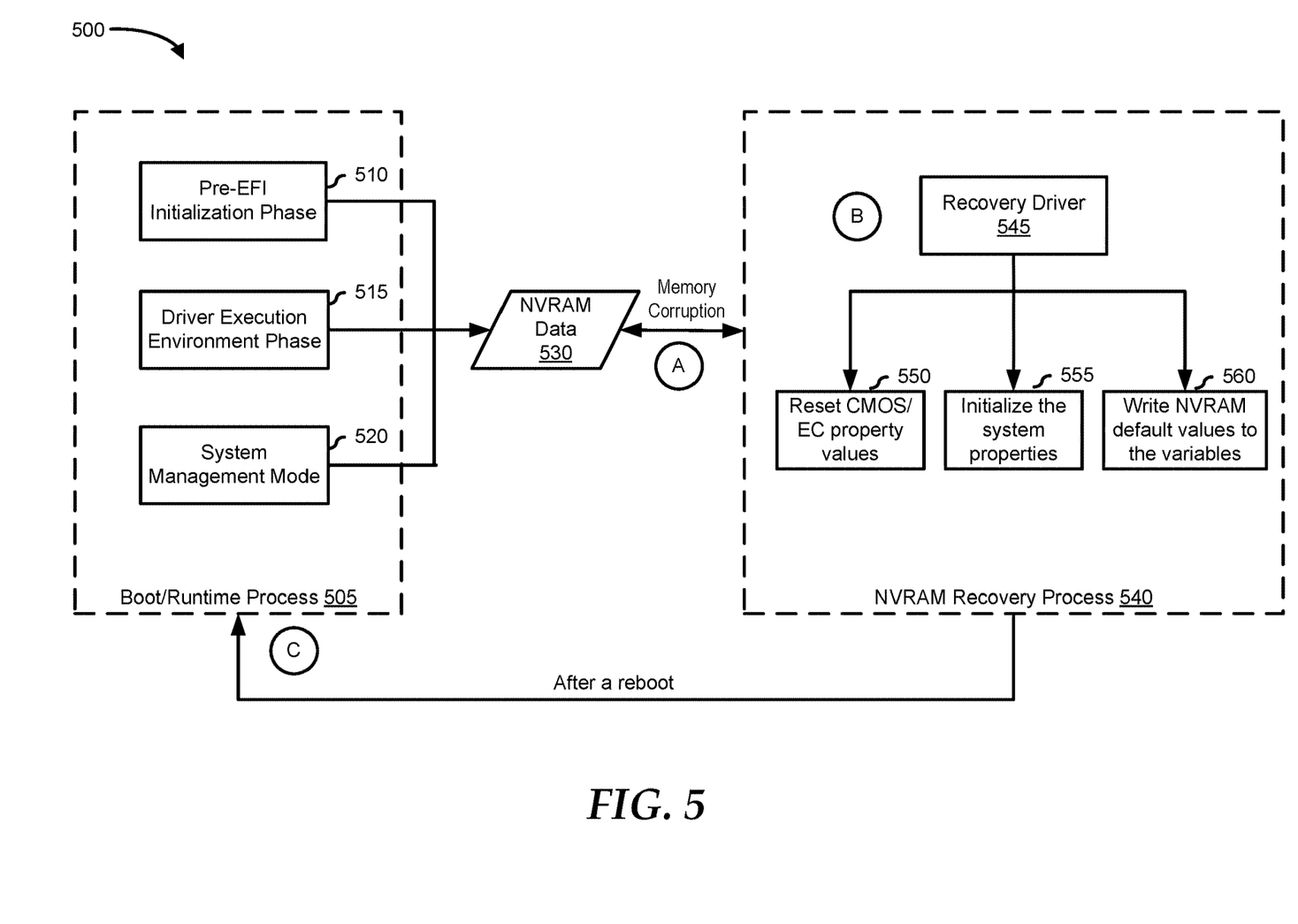
FIG. 5 is a block diagram illustrating an example system for detecting and recovering a corrupted NVRAM, according to an embodiment of the present disclosure.

FIG. 5 shows a block diagram of system 500 for detecting and recovering a corrupted NVRAM. System 500 includes a boot/runtime process 505, an NVRAM data 530, and an NVRAM recovery process 540. The components shown are not drawn to scale and NVRAM 405 may include additional or fewer components. In addition, connections between components may be omitted for descriptive clarity.

FIG. 5 has a letter of a series of letters A-C. Each of these letters represents a stage of one or more operations. Each figure is associated with a stage. Although these stages are ordered for this example, the stages illustrate one example to aid in understanding this disclosure and should not be used to limit the claims. Subject matter falling within the scope of the claims can vary with respect to the order of the operations.

At stage A, when an error or memory corruption is detected while processing NVRAM data 530, NVRAM recovery process 540 is triggered. A recovery pending driver may be set to true at the start of the recovery process. The recovery pending driver may be set to false after a successful reboot of the information handling system with the recovered data values. At stage B, recovery driver 545 performs one or more operations included in NVRAM recovery process 540. In one embodiment, recovery driver 545 resets the CMOS/property values at block 550, initializes the system properties at block 555, and writes NVRAM default values to the variables at block 560. Recovery driver 545 may perform other operations not shown.

The recovery process of the non-volatile random-access memory may include determining whether a header of the non-volatile random-access memory is corrupted. If the header is not corrupted, then the recovery process may determine if there are recovery data values in a spare store. If there are recovery data values in the spare store, then the contents of a data region associated with the header may be recovered using recovery data values. If there are no recovery data values in the spare store, then the contents of the data region may be recovered using factory default values. In another embodiment, the contents of the data region may be regenerated from bit patterns from snapshots taken of the data region prior to the error or corruption. If the header is corrupted, then the header and the data region may be recovered using the recovery data values if available. Otherwise, the header and the data region may be recovered from factory default data values. In another embodiment, the contents of the header and the data region may be regenerated from the bit patterns.

After NVRAM recovery process 540 is performed, the information handling system may reboot and may proceed to boot/runtime process 505. Boot/runtime process 505 includes various operations such as the pre-EFI initialization phase at block 510, driver execution environment phase 515, and system management mode 520 with recovered NVRAM data 530.

Although FIG. 3 show example blocks of method 300 in some implementation, method 300 may include additional blocks, fewer blocks, different blocks, or differently arranged blocks than those depicted in FIG. 3. Additionally, or alternatively, two or more of the blocks of method 300 may be performed in parallel. For example, block 330 and block 335 of method 300 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
   detecting, by a processor, a corruption of a non-volatile random-access memory of an information handling system;
   performing a recovery process of the non-volatile random-access memory that includes:
      determining whether a header of the non-volatile random-access memory is corrupted; and
      if the header is corrupted, then initializing system properties and regenerating the header based on a previous snapshot; and
   rebooting the information handling system.

2. The method of claim 1, further comprising notifying a storage component to reset memory variables to default values.

3. The method of claim 1, wherein the recovery process further includes resetting complementary metal-oxide-semiconductor/embedded controller properties.

4. The method of claim 3, wherein the resetting of the complementary metal-oxide-semiconductor/embedded controller properties is for aligning other memory variables to default values.

5. The method of claim 1, wherein the recovery process is performed after failing to initialize a variable service.

6. The method of claim 1, wherein the performing of the recovery process further includes regenerating a data region from snapshots taken of the data region prior to the corruption.

7. The method of claim 1, wherein the corruption is detected after a reclaim operation of the non-volatile random-access memory.

8. An information handling system, comprising:
- a non-volatile random-access memory device; and
- a memory manager interfaced with the non-volatile random-access memory device, the memory manager configured to:
  - detect corruption of the non-volatile random-access memory device;
  - perform a recovery process of the non-volatile random-access memory device that includes:
    - determining whether a header of the non-volatile random-access memory device is corrupted; and
    - if the header is not corrupted, then initializing system properties and regenerating the header based on a previous snapshot; and
  - reboot the information handling system.

9. The information handling system of claim 8, wherein the memory manager is further configured to notify a storage component to reset memory variables to default values.

10. The information handling system of claim 8, wherein the memory manager is further configured to reset complementary metal-oxide-semiconductor/embedded controller properties.

11. The information handling system of claim 10, wherein the reset of the complementary metal-oxide-semiconductor/embedded controller properties is to align other memory variables to default values.

12. The information handling system of claim 8, wherein the recovery process is performed after a variable service failed to initialize.

13. The information handling system of claim 12, wherein the recovery process further includes to regenerate a data region from bit patterns from snapshots taken of the data region prior to the corruption.

14. A non-transitory computer-readable medium including code that when executed performs a method, the method comprising:
- detecting corruption of a non-volatile random-access memory of an information handling system;
- recovering the non-volatile random-access memory that includes:
  - determining whether a header of the non-volatile random-access memory is corrupted; and
  - if the header is corrupted, then initializing system properties and regenerating the header based on a previous snapshot; and
- rebooting the information handling system.

15. The method of claim 14, wherein the method further comprises notifying a storage component to reset memory variables to default values.

16. The method of claim 14, wherein the recovering further includes resetting complementary metal-oxide-semiconductor/embedded controller properties.

17. The method of claim 16, wherein the resetting of the complementary metal-oxide-semiconductor/embedded controller properties is for aligning other memory variables to default values.

18. The method of claim 14, wherein the recovering is performed after failing to initialize a variable service.

19. The method of claim 14, wherein the recovering further includes regenerating a data region from bit patterns from snapshots taken of the data region prior to the corruption.

20. The method of claim 14, wherein the corruption is detected after a reclaim operation of the non-volatile random-access memory.

* * * * *